US008424003B2

(12) United States Patent
Degenaro et al.

(10) Patent No.: US 8,424,003 B2
(45) Date of Patent: Apr. 16, 2013

(54) UNIFIED JOB PROCESSING OF INTERDEPENDENT HETEROGENEOUS TASKS USING FINITE STATE MACHINE JOB CONTROL FLOW BASED ON IDENTIFIED JOB TYPE

(75) Inventors: Louis R. Degenaro, White Plains, NY (US); James R. Challenger, Garrison, NY (US); James R. Giles, Yorktown Heights, NY (US); Paul Reed, Brookline, MA (US); Rohit Wagle, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1625 days.

(21) Appl. No.: 11/444,129

(22) Filed: May 31, 2006

(65) Prior Publication Data
US 2007/0283351 A1    Dec. 6, 2007

(51) Int. Cl.
*G06F 9/46* (2006.01)
(52) U.S. Cl.
USPC .......................................................... 718/101
(58) Field of Classification Search .................. 718/102, 718/101; 712/18, 201
See application file for complete search history.

(56) References Cited

U.S. PATENT DOCUMENTS

| 7,509,654 B2* | 3/2009 | Jennings et al. ............... 719/318 |
| 2002/0046072 A1* | 4/2002 | Arai et al. .......................... 705/8 |
| 2003/0120708 A1* | 6/2003 | Pulsipher et al. .............. 709/106 |
| 2003/0177046 A1* | 9/2003 | Socha-Leialoha ................. 705/7 |
| 2004/0153967 A1* | 8/2004 | Bender et al. .................. 715/513 |
| 2004/0268238 A1* | 12/2004 | Liu et al. ......................... 715/513 |
| 2005/0065836 A1* | 3/2005 | Tanaka et al. ...................... 705/9 |
| 2006/0247964 A1* | 11/2006 | Baturytski et al. ................ 705/9 |
| 2007/0083813 A1* | 4/2007 | Lui et al. ........................ 715/709 |
| 2007/0236708 A1* | 10/2007 | Jahn et al. ....................... 358/1.6 |

OTHER PUBLICATIONS

U.S. Appl. No. 11/619,691, filed Jan. 4, 2007, and titled "Data Driven Finite State Machine Engine for Flow Control".
LLNL Gang Schecluler, http://www.linl.gov/asci/pse_trilab/sc98.summary.html.

* cited by examiner

*Primary Examiner* — Jennifer To
*Assistant Examiner* — Brian Chew
(74) *Attorney, Agent, or Firm* — August Law, LLC; George Willinghan

(57) ABSTRACT

Methods and systems are provided for unified job processing of interdependent heterogeneous tasks within a domain containing a plurality of nodes. Jobs containing components to be processed in the domain are submitted and are identified by type. A job control flow associated with the job type is identified and used to process the components of the job on various nodes within the domain. Multiple job control flows are handled simultaneously, and provisions are made for sharing common job components among jobs. The job control flow utilizes a finite state machine where a given instance of the finite state machine applies to a specific job type. The finite state machine can be expressed using extensible mark-up language schema.

18 Claims, 9 Drawing Sheets

UNIFIED JOB PROCESSING OF INTERDEPENDENT HETEROGENEOUS TASKS USING FINITE STATE MACHINE JOB CONTROL FLOW BASED ON IDENTIFIED JOB TYPE

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention relates to information processing systems. More particularly, the present invention relates to methods and apparatus for processing jobs containing interdependent heterogeneous tasks in a distributed computing environment.

BACKGROUND OF THE INVENTION

An often employed strategy for solving complex problems is to break a single complex problem into a number of smaller more manageable problems and then to coordinate results from all of the smaller problems. This strategy can be applied recursively. In the field of information processing systems, complex problems are managed using several well known techniques such as grid computing, gang scheduling, scavenger scheduling and supercomputing.

The term "grid computing" emerged in the early 1990's using the metaphor of electric power grids to describe its essence. Just as electric power grids enable easy access to electric power for all, so do computing grids provide easy access to computing resources. A "task" or "job" is described to a grid computing system, and the grid computing system then provides the power to carry out that task. Tasks range in complexity from a very simple single thread or process, i.e. a sub-task, to a very complex and large collection threads and processes.

The term "gang scheduling" refers to dispatching multiple sub-tasks, for example threads and processes that constitute a given job, in parallel with the expectation that each individual sub-task has a consumer-producer relationship with one or more of the other individual sub-tasks. By scheduling multiple sub-tasks together, the wait time for interdependent sub-task interaction can be reduced. Conversely, many sub-tasks may be dispatched that are never employed, and sub-tasks are never shared between jobs. One example of gang scheduling is the LLNL Gang Scheduler. In the LLNL Gang Scheduler, jobs are classified according to priority and dispatched accordingly. Using this scheme, jobs compete with each other for the available computing resources.

The term "scavenger scheduling", e.g., Condor and LoadLeveler, describes the harvesting of unused central processing unit (CPU) cycles. Typically, an interactive user's system is idle during various periods of the day, for example during lunch hour and late night hours. Therefore, the interactive system is available to loan for other tasks during these idle periods. Scavenger systems "collect" both jobs and idle systems and perform a matching algorithm to dispatch jobs to idle systems. However, scavenger systems often lose and gain processors unpredictably. In addition, a significant amount of time can be wasted just preparing to run a job on an idle processor, and this amount of time can exceed the actual running time of the job. For example, setup and dismantle time can exceed the amount of time actually spent running the job.

The term "supercomputing", e.g., Cray-2 and Blue Gene, has evolved over the years. In the 1970's the term referred to fast scalar processors, and in the 1980's, the term referred to vector processors. By the 1990's, the term had evolved to include parallel processors, where replication of "basic" processors could be on the order of 1000's to form a physical supercomputer. Presently, clusters computers, which are usually homogeneous and sometimes heterogeneous, utilize high-speed interconnections to form a virtual supercomputer. Each supercomputing platform provides the foundation for solving complex problems; however, the determination of how to employ the assembled processing power remains with the operator of the computing system.

These solutions to solving complex problems in a computing environment lack desirable functionality. Each of these different paradigms attempts to solve a particular aspect of managing a large-scale fault-tolerant computing environment by essentially employing a one-size-fits-all approach to scheduling and dispatching. None of the prior approaches adequately managed large-scale distributed jobs in the presence of user-defined policies, e.g., security, priority, consumption. Policies are used to define the ways in which system components can interact with each other. In general, the policies specify event-condition-action tuples but do not give a clear and reliable picture of all possible runtime flows through a system. In addition, prior solutions to complex problem management were not adept at understanding, observing and coordinating job behavior or handling catastrophes such as task component failure, node failure, network faults, lost messages and duplicate messages.

Furthermore, managing the state of a large job in an undisciplined fashion is prone to faults requiring human intervention, an unacceptable circumstance for jobs comprising dispatching of sub-tasks to hundreds, thousands, or even tens-of-thousands of nodes. Even more complexity is introduced when sub-task sharing between jobs is enabled.

SUMMARY OF THE INVENTION

The present invention is directed to methods and systems that provide for unified job processing of interdependent heterogeneous tasks. Exemplary methods in accordance with the present invention perform scheduling and dispatching according to a finite state machine (FSM) that defines flow control. Each job type is associated with its own FSM flow control instance. Each FSM flow control instance may correspond to a different FSM flow control definition. Each FSM flow control definition can be expressed in a well-known external format, e.g. XML. Each job instance is associated with a flow control proxy representing an instance of an FSM flow control instance.

Unlike existing job management systems that have one and only one job control flow, exemplary methods in accordance with the present invention facilitate evolution of tasks in distributed computing environments. Control flows are varied based on job type, different management flows for different types of jobs are maintained within the same domain. Exemplary methods in accordance with the present invention provide for external specification of job management and orchestration, sharing or partitioning of resources among various jobs and supporting desperate control flows simultaneously. Control flow types are correlated with job types, and job control flow is altered dynamically. Systems and methods in according with the present invention provide the ability to arbitrarily log, trace, record, and notify external entities of job state transitions, to dynamically alter job flows according to external influencers, to specify and encapsulate job fault management via external specifications and to dynamically alter job fault management according to external influencers.

Exemplary embodiments of methods for unified job processing of interdependent heterogeneous tasks in accordance with the present invention include submitting a job to be executed within a given domain on a plurality of nodes disposed within that domain, identifying a job type associated with the submitted job, selecting a job control flow to be used to process the submitted job in the given domain based on the identified job type and processing the submitted job in accordance with the select job control flow using one or more of the plurality of nodes. In one embodiment, each submitted job is saved to a persistent storage location. Suitable job types to be identified include, but are not limited to, a program element job type, a system-administration job type, a system-maintenance job type, a network-manager job type, a security-manager job type, a storage-manager job type and combinations thereof.

In one embodiment in order to select the job control flow, a suitable job control flow is identified from a plurality of pre-determined job control flows. The pre-determined job control flows are maintained in either a set or list containing the plurality of pre-determined job control flows. In one embodiment, selection of the job control flow involves identifying a finite state machine flow control instance associated with the identified job type. Identification of the finite state machine flow control instance includes selecting a finite state machine flow control instance from a plurality of pre-determined finite state machine flow control instances. Each finite state machine flow control instance corresponds to a distinct finite state machine flow control definition. In one embodiment, each finite state machine flow control definition is expressed using extensible mark-up language.

In one embodiment, in order to process the submitted job in accordance with the job control flow, components for each submitted job are identified, and resources are matched to the identified components by identifying eligible nodes within the domain for executing each one of the identified components. The dispatch of each component among the various nodes is scheduled, and this dispatch schedule is delivered to a dispatch controller. Execution of the components is arranged in accordance with the dispatch schedule, and components are dispatched to nodes in accordance with the arranged execution.

In one exemplary method for unified job processing of interdependent heterogeneous tasks, a job control flow is identified using a runtime engine. The submitted job is accepted and processed in accordance with the identified job control flow. The identified job control flow conforms to a schema defining a finite state machine, the finite state machine comprising one start state comprising job submission, a final state comprising job completion, one or more intermediate states, one or more transitions to advance between states and combinations thereof. In one embodiment, a proxy is employed by the runtime engine to represent a current state of the accepted job.

In order to process the accepted job, the current state of the accept job as represented by the proxy is changed using transitions. These transitions include notification of completion of a subtask, notification of a subtask error, notification of subtask migration, notification of a node failure, notification of job submission, notification of job validation, notification of job resource matching, notification of job optimization, notification of job dispatching, notification of job holding, notification of job running, notification of a job cancellation, notification of job suspension, notification of job resumption, notification of job eviction, notification of job checkpoint, notification of job completion, notification of a timer expiration and combinations thereof.

In one embodiment, identifying the job control flow includes identifying a job control flow associated with a job type, and accepting the submitted job includes accepting a submitted job of the job type associated with the job control flow. In one embodiment, at least two different job control flows are employed in parallel using the runtime engine. Processing the accepted job can also include managing at least one shared program element, and identifying the job control flow can include obtaining the job control flow from an external source containing an extensible mark-up language definition, a database, an expert system and combinations thereof. In one embodiment, identification of the job control flow includes comprises identifying the job control flow at runtime initialization, identifying the job control flow at a timed interval, identifying the job control flow in response to a message and combinations thereof. The method can also include revising the identified job flow control subsequent to runtime initialization.

DETAILED DESCRIPTION

Systems for use in exemplary methods in accordance with the present invention include processing environments containing many features arranged to enable large-scale fault-tolerant distributed computing. These systems are intended to scale to thousands of jobs composed of hundreds of components or sub-tasks running on tens-of-thousands of nodes. Among a variety of system features are features related to submission, scheduling, dispatching, execution, and processing jobs, which are referred to generally as "job management" or "job orchestration". A given job includes a variety of components or sub-tasks. Suitable components include, but are not limited to, program elements (PEs), system tasks, other tasks and combinations thereof. A PE is a dispatchable unit that is sent to a processing node for execution, implementing an interface defining a set of characteristics for processing and filtering immense quantities of real time data. A given PE can contain constraints on the capabilities provided by a node, the PE types with which it can share a node and the value of the information it is producing, among other constraints. In one embodiment, a given PE is utilized by a single job. Alternatively, a given PE is used by and shared among a plurality of simultaneously executed jobs.

Figure 1:
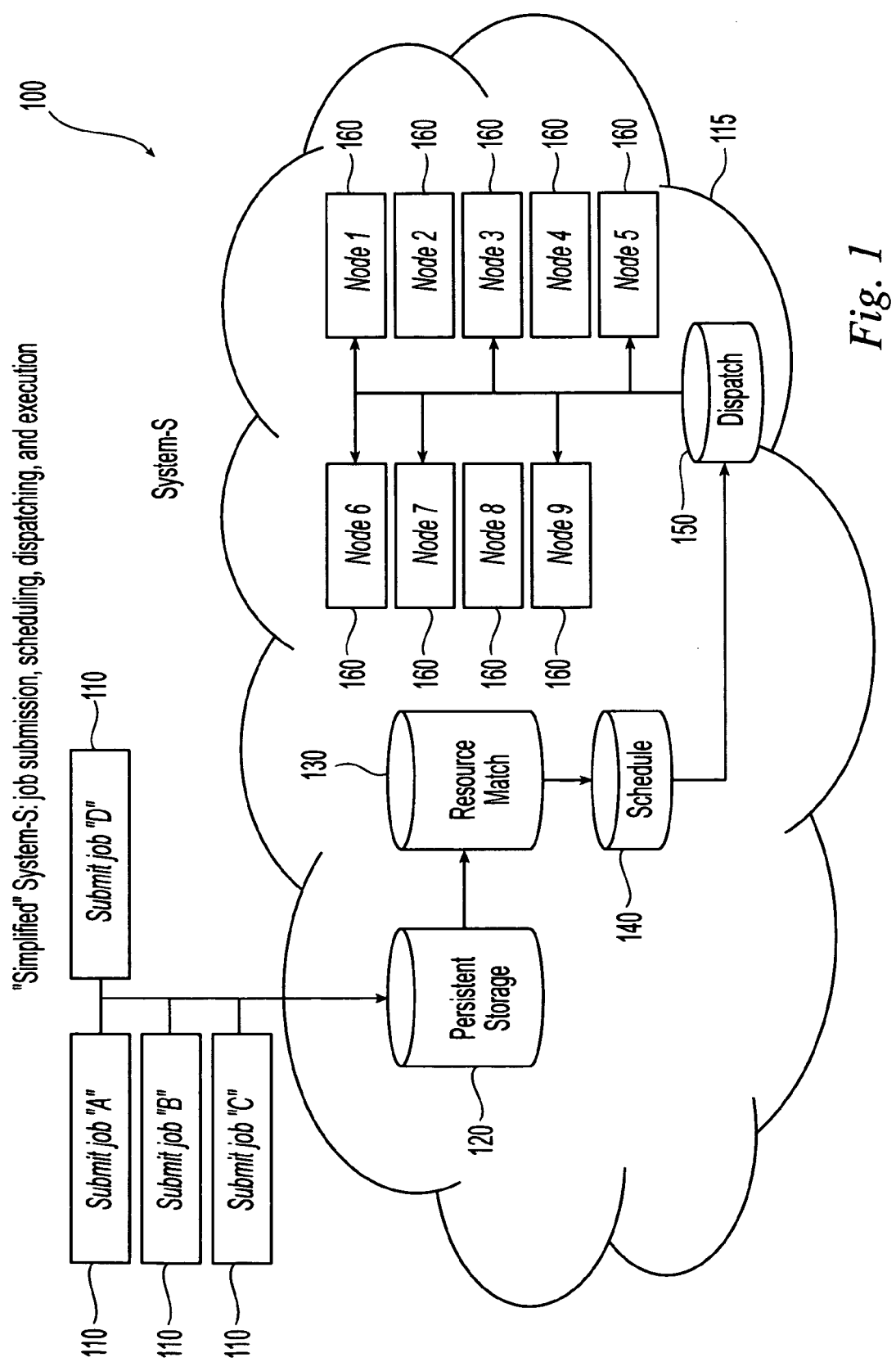
FIG. 1 is a schematic representation of an embodiment of a system for use with job control flows in accordance with the present invention.

Referring initially to FIG. 1, an exemplary arrangement for job submission, scheduling, dispatching, execution and completion in a sample system domain 100, referred to as System-S, in accordance with the present invention is illustrated. As illustrated, a plurality of jobs 110 is submitted for processing within a given domain 115. Although illustrated as four jobs, any number of jobs can be submitted from at least one job up to a plurality of jobs. Each job can be submitted from a source or node located external to the given domain 115 or from a source or node disposed within the given domain 115. In one embodiment, each job that is submitted is saved in persistent storage 120. Suitable methods for saving job submissions in persistent storage are known and available in the art. Each submitted job is resource matched 130 to evaluate and to determine on which nodes within the domain each of the components of a given job is eligible to run. For example, a given PE can require specific software for execution, and the software license for this specific software may only be available on certain nodes. Therefore, nodes that lack the necessary software license are eliminated as eligible nodes for the execution of that PE. For a given component of a submitted job, more than one resource may be matched. Therefore, resource matching provides a list or set of acceptable resources for processing a given component.

Once resources, e.g. eligible nodes, have been matched with the components of the submitted jobs, the processing of these jobs within the domain requires, for each job component, selecting a resource from the set of potential resources on which the component will be executed and scheduling that component for execution on the selected resource. In one embodiment, a scheduler 140 processes and considers all submitted jobs for the purpose of selecting resources and scheduling the execution of the various components on these selected nodes. The resource selections and schedule developed by the scheduler can be expressed as a set of orders that are delivered to a dispatcher 150. The dispatcher arranges the execution of the various submitted job components among the plurality of nodes 160 within the domain in accordance with the set of orders provided by the scheduler. The set of orders from the scheduler can be dispatch upon the submission of a given job, upon the cancellation of a previously submitted job, in response to external input or over time as needed to update or refresh the execution of the jobs on the system. Suitable instructions provided by the scheduler in the set of orders include, but are not limited to, specifying the start of a new job, stopping a running job, relocating the execution of one or more job components to different nodes, modifying assigned resource allocations and combinations thereof.

Figure 2:
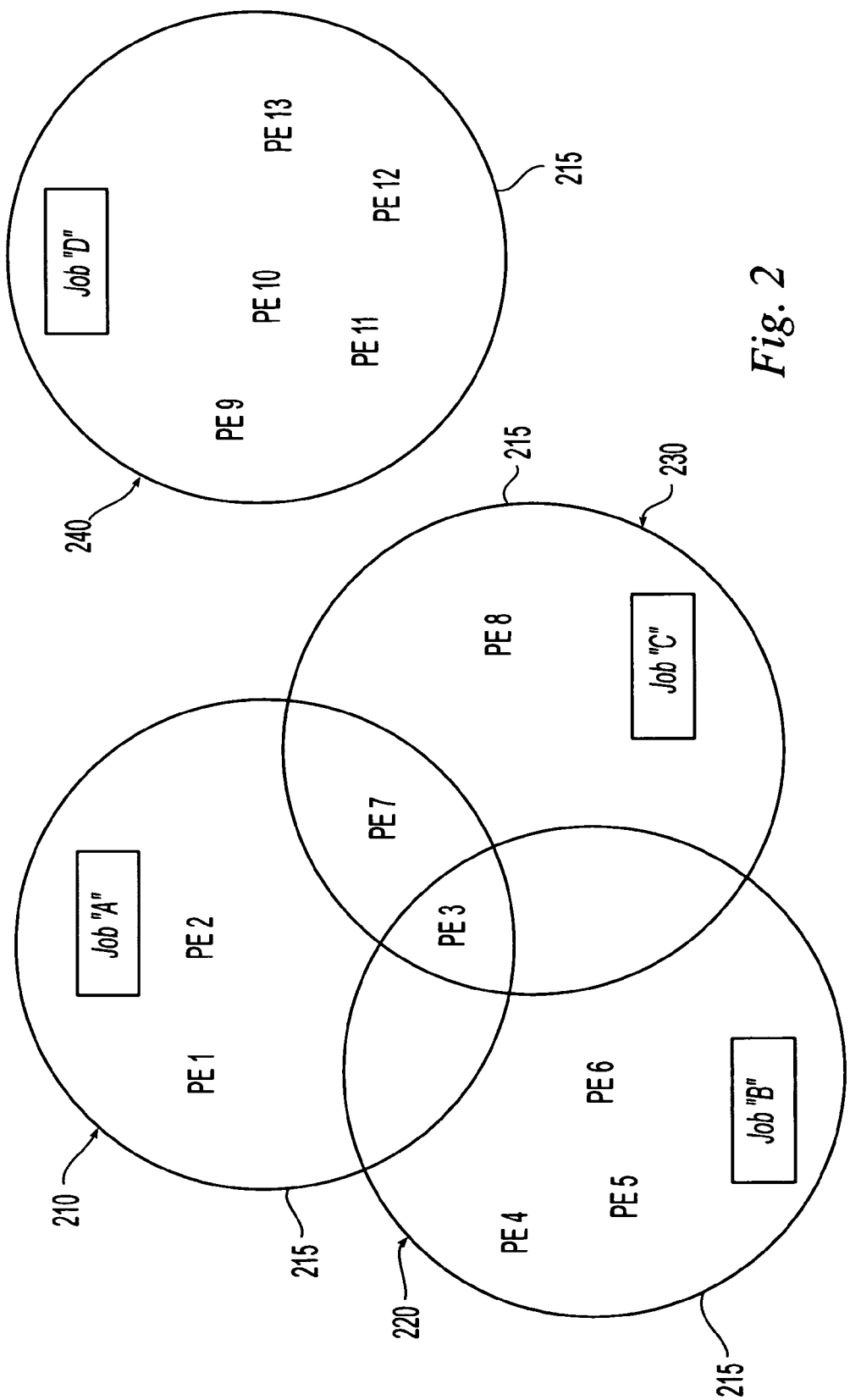
FIG. 2 is an illustration of an embodiment of the relationship between jobs and job components.

Referring to FIG. 2, an illustration of component sharing for an exemplary embodiment of a plurality of PE-type jobs is illustrated. A circle 215 is provided to represent a given job and the PEs that constitute the job. These jobs include job A 210, job B 220, job C 230 and job D 240. Within each circle 215 the PEs that make up a given job are listed. Job A contains PE1, PE2, PE3 and PE7. Job B contains PE3, PE4, PE5 and PE6. Job C contains PE3, PE7 and PE8. Job D contains PE9, PE10, PE11, PE12 and PE13. As illustrated, PEs 3 and 7 are shared. Specifically, PE7 is shared between jobs A and B, and PE3 is shared among by A, B and C. All other PEs are exclusive to a given job.

While jobs A, B and C share PEs, job D does not share any PEs. In one embodiment, jobs A, B and C are classified as secret jobs, and job D is classified as a top secret job. An exemplary policy applied to the system in which these four jobs are to be executed is to prohibit processing on a common node the PEs for jobs classified as "secret" with those for jobs classified as "top secret".

Figure 3:
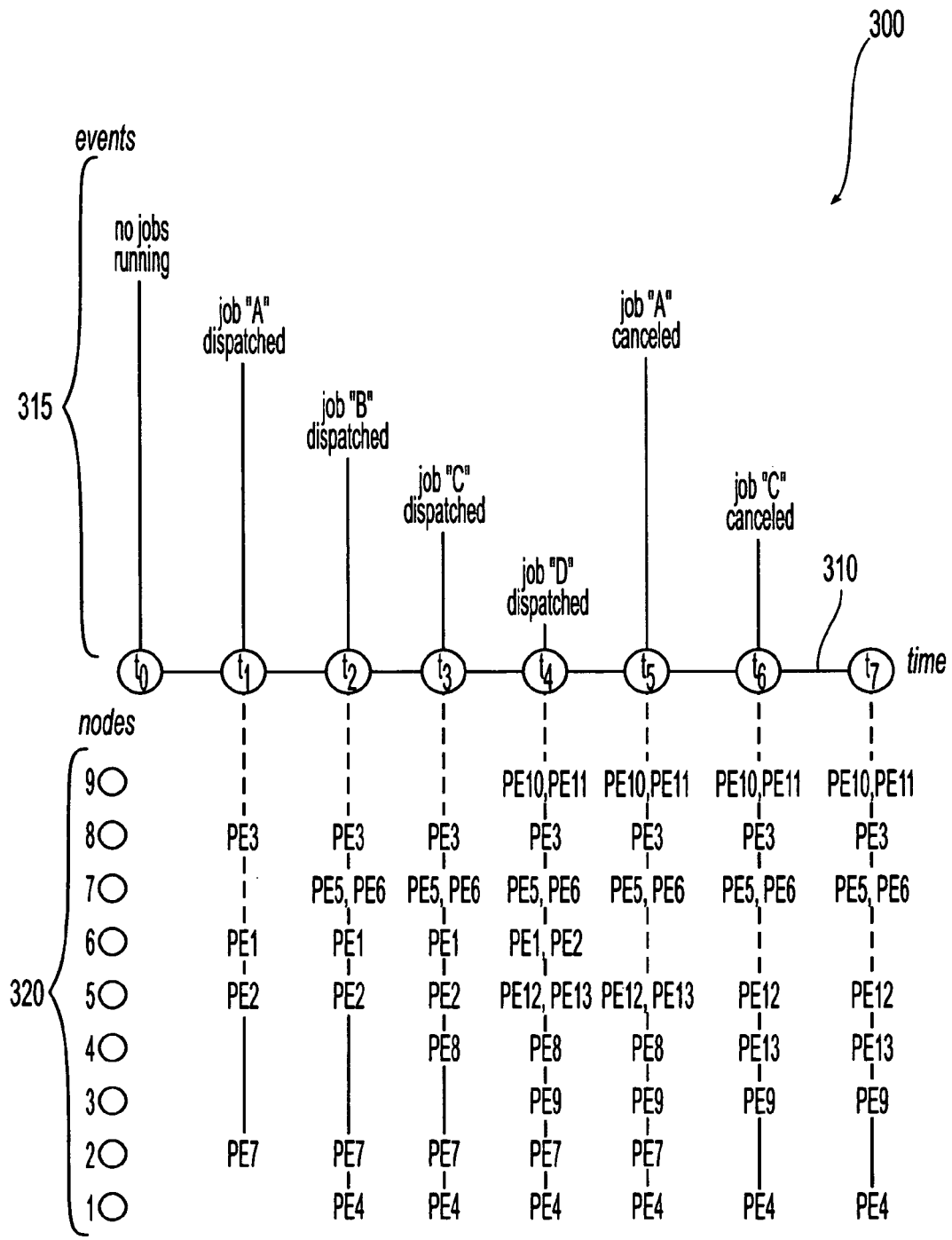
FIG. 3 is a timeline illustrating an embodiment of job dispatch and cancellation and program element node assignment.

An exemplary illustration of job dispatch and cancellation and of resource matching 300 for all four jobs is provided in FIG. 3. Job dispatch and cancellation is show over a timeline 310 beginning at time to and proceeding through time $t_7$, with events occurring at discreet times. Dispatch and cancellation events 315 are illustrated above the timeline and the allocation of PEs among the nodes 320 is illustrated below the timeline. At time $t_0$, no jobs are running in the system. At time $t_1$, job A has been submitted 110 and saved to persistent storage 120, resource matched 130, scheduled 140, and dispatched 150 (FIG. 1). At times, $t_2$, $t_3$, and $t_4$ the same has occurred for jobs B, C and D respectively. At time $t_5$ job A is cancelled, and at time $t_6$ job C is canceled.

Referring to the PE node assignment portion of the timeline, the location of each executing PE is shown in conjunction with dispatch and cancellation events as time progresses from time $t_0$ through time $t_7$. The possible locations for PEs to run in this example are nodes 1 through 9. At time $t_0$, no PEs are running, because no jobs have been dispatched. At time $t_1$, job A is dispatched, and the scheduler 140 has determined that the PEs associated with job A are to be distributed as follows: PE1 on node 6, PE2 on node 5, PE3 on node 8 and PE7 on node 2. The dispatcher 150, working in conjunction with an agent on each of the nodes, starts, stops, suspends, resumes, evicts or checkpoints the PEs as directed by the scheduler or other authorized entity.

At time $t_2$, job B is dispatched in similar fashion. PE4 is started on node 1, and both PE5 and PE6 are started on node 7. PE3 does not have to be started, because job B and job A share PE3, and PE3 is already running on behalf of job A. The various PEs may be connected to each other, for example for communications purposes, by some other authorized entity. The job dispatcher may participate in establishment of the communications channels, for example in the capacity of notifying a connection manager of the PEs containing the newly dispatched, or canceled, job.

At time $t_3$ job C is dispatched such that PE8 is started on node 4. Since the remaining PEs that constitute job C, PE3 and PE7, are already running by way of dispatching jobs B and A respectively, no other PEs are started in response to job C dispatching. The last job to be dispatched is job D at time $t_4$. Job D includes PE9 on node 3, PE10 and PE11 on node 9 and PE12 and PE13 on node 5. Although the dispatch and cancellation of events has been described in a discrete, sequential arrangement, other arrangements for dispatch and cancellation are possible including dispatching and canceling a plurality of events in parallel. For example, the dispatching of all four jobs may occur in parallel.

At time $t_5$, job A is canceled, resulting in the job manager halting execution of PE1 and PE2 on node 6. The other two PEs contained in job A, PE3 and PE7, remain running, because these PEs are also utilized by one or both of jobs B and job C. At time $t_6$, job C is canceled, resulting in the job manager halting execution of PE8 on node 4 and PE7 on node 2. PE7 halted because both of the jobs utilizing that PE have been halted. In addition, at the same time, the scheduler has determined that PE13 should be migrated from node 5 to node 4. Nothing further occurs at time $t_7$, and the PE node allocations remain unchanged at this time. Shown in FIGS. 1-3 is the ability of a system manager to both share and partition resources, specifically PEs and nodes.

Exemplary methods in accordance with the present invention utilize a pre-defined job control flow to determine the submission, resource matching, scheduling and dispatching of submitted and accepted jobs. Each job control flow can be inputted from an external source and can be modified and updated over time. In addition, a given job control flow is created or selected to match a given job. In one embodiment, for example, a suitable job control flow is selected from a plurality of pre-determined job control flows based on an identification of the type of job submitted.

Figure 4A:
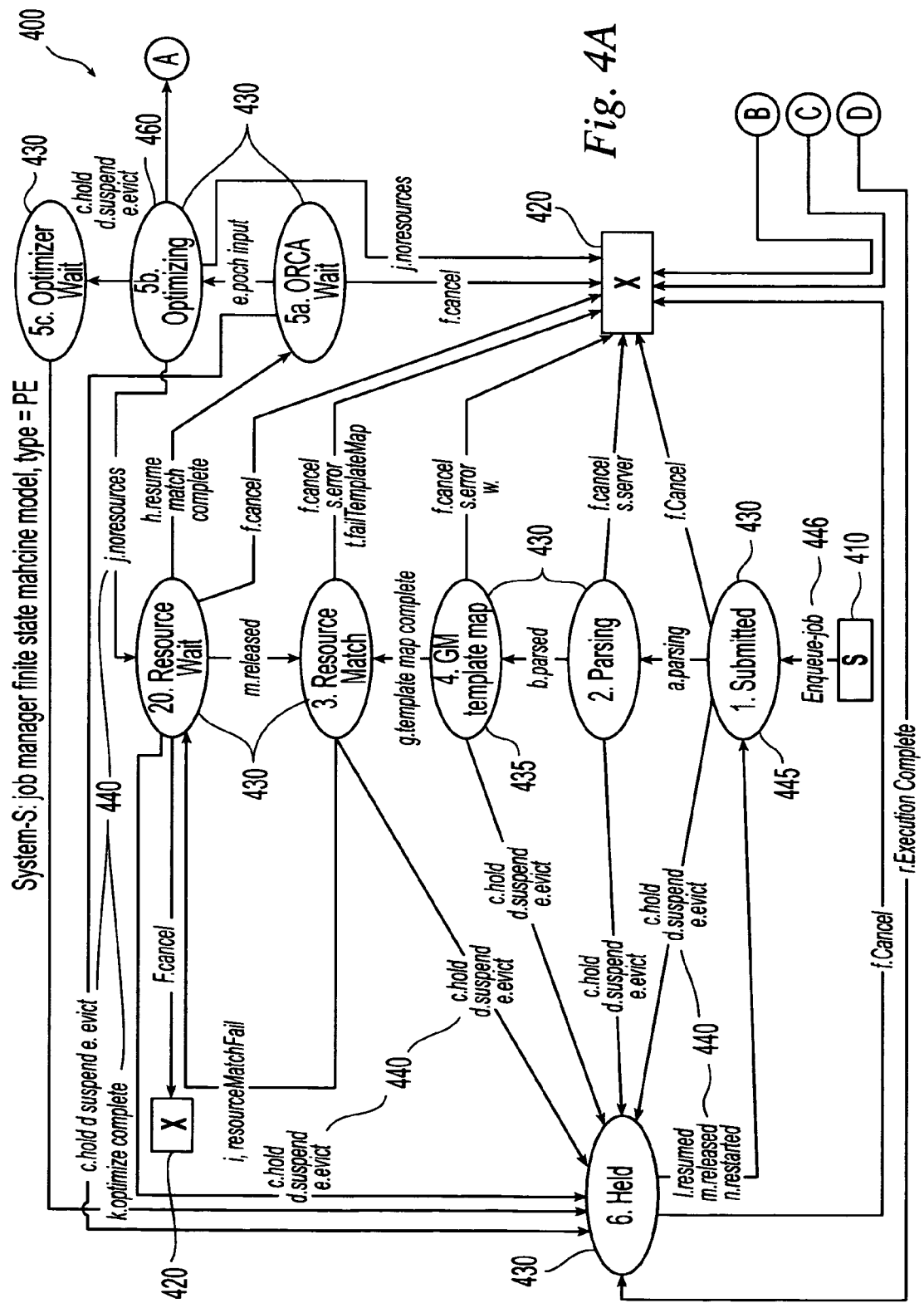
FIG. 4A is a first part of an illustration of an embodiment of a finite state machine defining flow control for unified processing of interdependent heterogeneous tasks in accordance with the present invention.
Figure 4B:
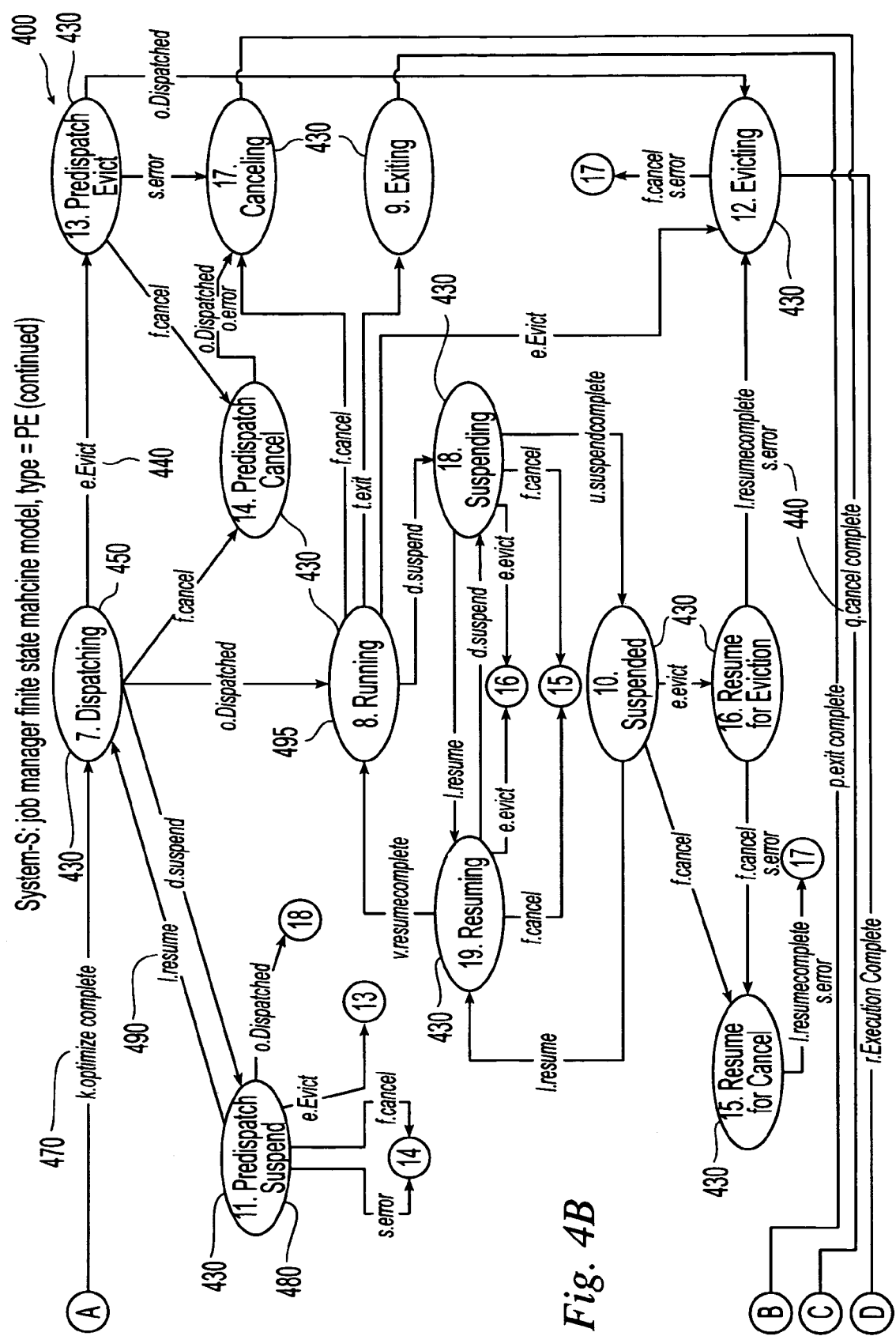
FIG. 4B is the second part of the illustration of FIG. 4A.

In one embodiment, the job control flow is expressed as an instance of a finite state machine (FSM). As illustrated in FIGS. 4A-B, an exemplary FSM 400 representing the job control flow for unified job processing of interdependent heterogeneous tasks in accordance with the present invention is shown. The arrangement and operation of FSMs in general are known to those of skill in the art. In one embodiment, the FSM 400 representing the management of job control flow contains an initial or start state 410 and a final or exit state 420. Although illustrated as a single start state and a single final state, other arrangements and numbers of start and stop states can be used. Jobs enter the system at the start state 410 and exit the system at the final state 420. The FSM also includes a plurality of intermediate states 430 disposed logically between the start state and the final state. Any number of intermediate states can be included in the FSM depending on the desired job flow control. As illustrated, the FSM includes 20 intermediate states, numbered 1-20. These intermediate states are 1. Submitting, 2. Validating, 3. Resource Match, 4. GM Template Map, 5. Optimizing [comprising a. ORCA Wait, b. Optimizing, and c. Optimizer Wait], 6. Held, 7. Dispatching, 8. Running, 9. Exiting, 10. Suspended, 11. Predispatch Suspend, 12. Evicting, 13. Predispatch Evict, 14. Predispatch Cancel, 15. Resume For Cancel, 16. Resume For Eviction, 17. Canceling, 18. Suspending, 19. Resuming, and 20. Resource Wait. Graph Manager (GM) Template Map is the state whereby PE sharing or not is decided. Optimizer Resource Common Area (OCRA) is the place where the job manager and the optimizer, which is also known as scheduler, can trade information.

Job control flow proceeds between states, from one state to another state, as determined by a plurality of transitions 440. These transitions are illustrated as labels on the arcs between states. For example, the Dispatching state 450 can be entered by being in the Optimizing state 460 and satisfying the k. optimize complete transition 470 or by being in the Predispatch Suspend state 480 and satisfying the 1. resume transition 490. Each state 430 within a given FSM is realized by way of the transitions. In one embodiment, the transitions are generated internally by the job manager. For example, for a particular job in the Dispatching state 450, once all of the corresponding PEs are running, as determined, for example, by messages from nodes hosting them to the job manager, the job manager generates a dispatched transition to move to the Running state 495. Alternatively, transitions are provided from external sources. The job manager can also define timers to trigger transitions upon expiration of a pre-defined period of time.

Figure 5A:
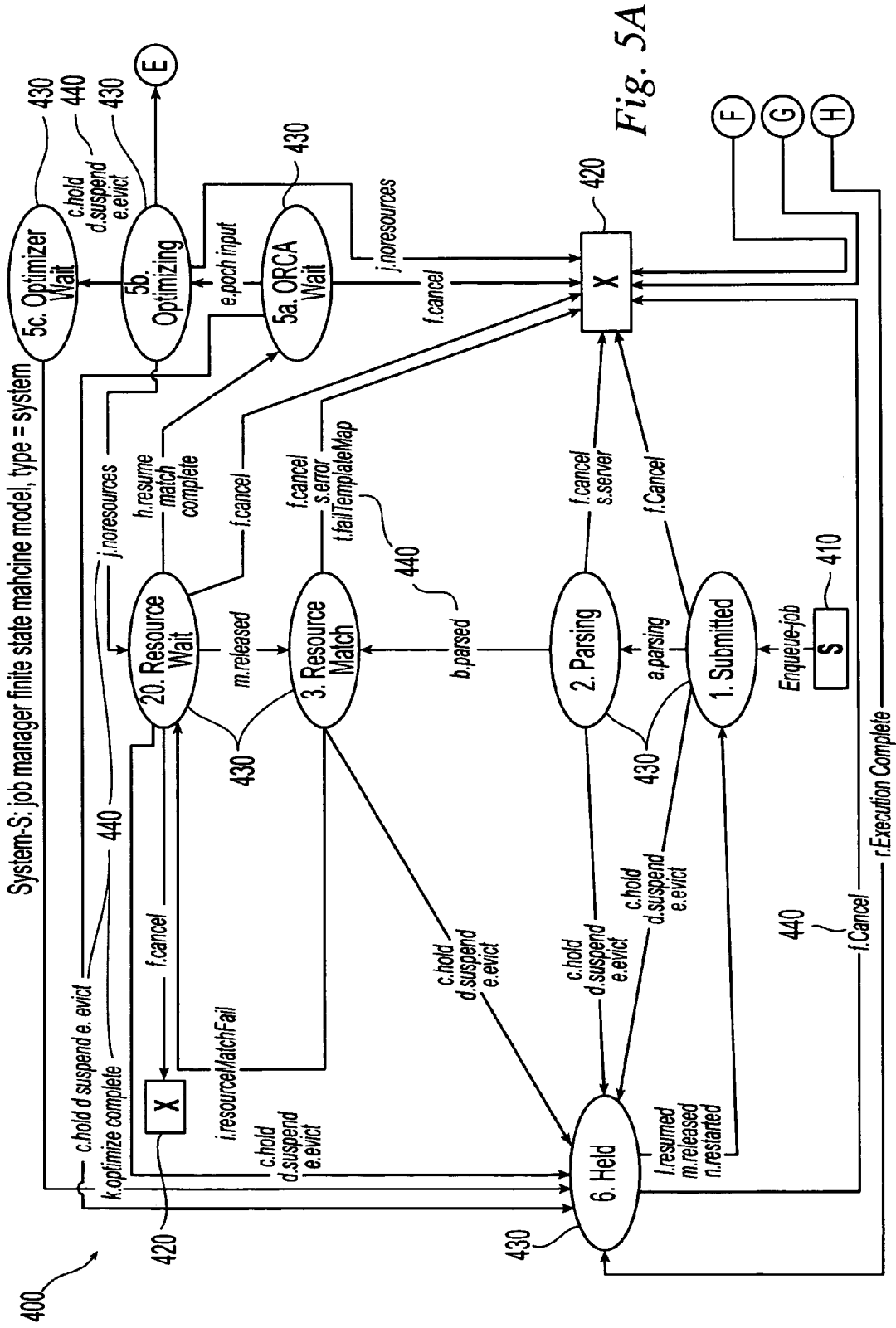
FIG. 5A is a is first part of an illustration of another embodiment of a finite state machine.
Figure 5B:
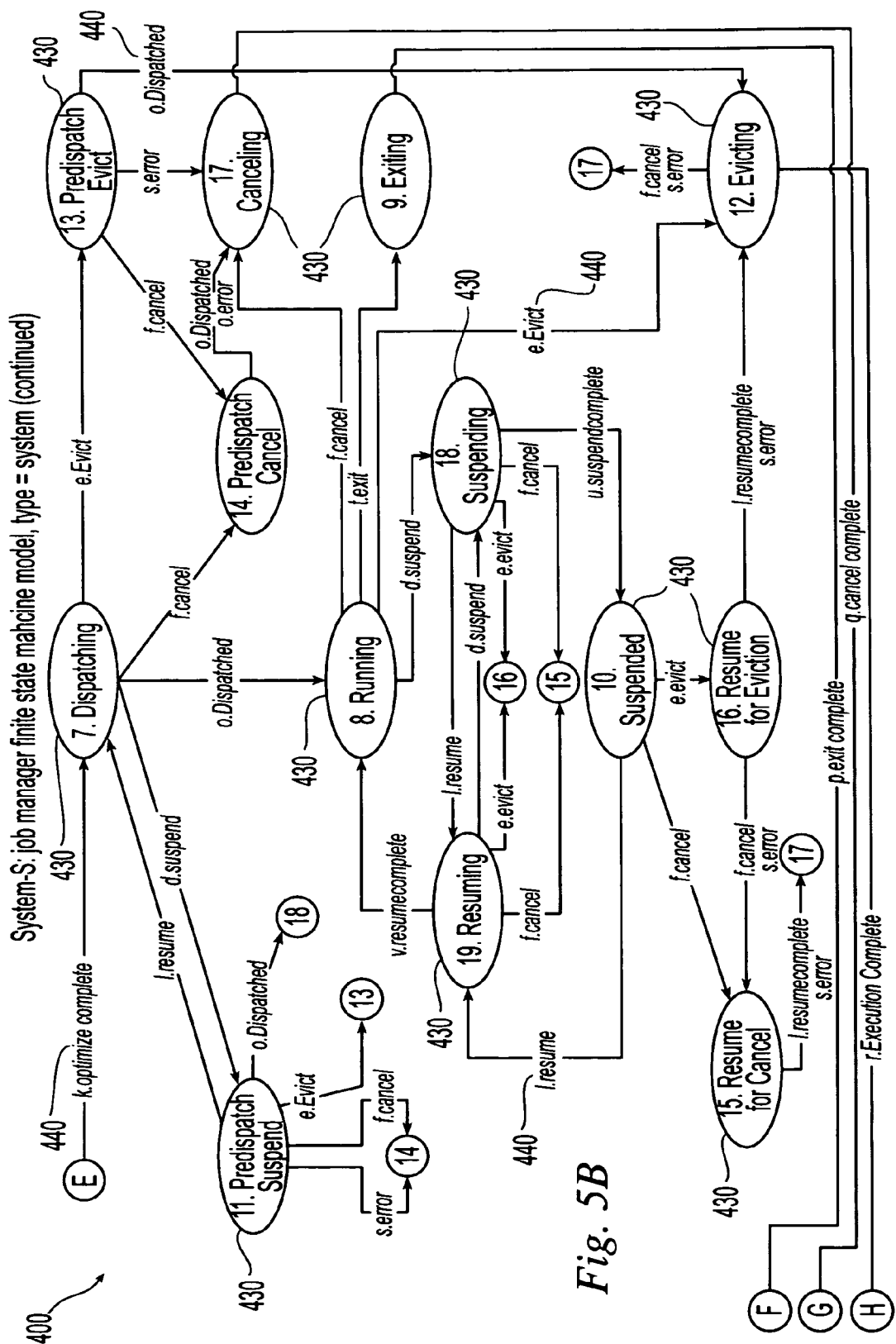
FIG. 5B is the second part of the illustration of FIG. 5A.

In one embodiment, a given job control flow, and hence the FSM that represents this job control flow, is arranged for a particular or specific type or category of job. As illustrated in FIGS. 4A-B, the FSM 400 represents the job control flow for jobs whose components are PEs, that is for job type PE. Referring to FIGS. 5A-B, another embodiment of a FSM 400 for use in job control flow in accordance with the present invention is illustrated. In the FSM of this embodiment, the GM Template Map state 435 (FIGS. 4A-B) has been eliminated. The FSM 400 of this embodiment represents a job control flow for jobs whose components are system tasks, that is for a job type of system. Other suitable job types include, but are not limited to, PE-lite, system-administration, system-maintenance, network-manager, security-manager, storage-manager and combinations thereof, and the FSMs that correspond to those job types can be employed simultaneously by the system.

In one embodiment, systems and methods in accordance with the present invention utilize an engine that is capable of receiving a variety of different types of job submissions and of matching the job type to the appropriate job control flow. The engine is a general purpose engine capable of interpreting one or more externalized job flow control descriptions, e.g. XML, accepting one or more externalized job descriptions, e.g. XML, matching each job description to a corresponding job control flow and managing each job accordingly. For example, the engine has the ability to recognize control flows for PE and system job types simultaneously. In one embodiment, each of these control flows, and others, are implemented by employing "Data Driven Finite State Machine Engine For Flow Control", which is identified by IBM Docket No. YOR920060412US1.

In one embodiment, an XML schema is used to describe valid job control flow instances of the FSM. Methods for using XML schema to validate and parse conforming XML documents are known and available in the art. An exemplary XML schema for the PE job type appears below.

```
<?xml version="1.0" encoding="UTF-8"?>
<xsd:schema xmlns:xsd="http://www.w3.org/2001/XMLSchema"
xmlns:fsm="http://www.ibm.com/distillery/fsm" elementFormDefault=
"qualified" targetNamespace="http://www.ibm.com/distillery/fsm">
<xsd:element name="fsm" type="fsm:fsmType"/>
<xsd:complexType name="fsmType">
    <xsd:sequence>
        <xsd:element maxOccurs="unbounded" minOccurs"0"
name="logger" type="fsm:loggerType"/>
        <xsd:element maxOccurs="unbounded" minOccurs="0"
name="objectmap" type="fsm:objectMap"/>
        <xsd:element maxOccurs="1" minOccurs="1" name="initial"
type="fsm:initialState"/>
        <xsd:element maxOccurs="1" minOccurs="1" name="final"
type="fsm:finalState"/>
        <xsd:element maxOccurs=<unbounded" minOccurs="1"
name="state" type="fsm:stateType"/>
    </xsd:sequence>
    <xsd:attribute name="id" type="xsd:token" use="required"/>
    <xsd:attribute name="wildcard" type="xsd:token" use="optional"/>
</xsd:complexType>
<xsd:complexType name="initialState">
    <xsd:attribute name="id" type="xsd:token" use="required"/>
</xsd:complexType>
<xsd:complexType name="finalState">
    <xsd:attribute name="id" type="xsd:token" use="required"/>
</xsd:complexType>
<xsd:complexType name="stateType">
    <xsd:sequence>
        <xsd:element maxOccurs="unbounded" minOccurs="0"
name="property" type="fsm:nvPairType"/>
        <xsd:element maxOccurs="unbounded" minOccurs="0"
name="transition" type="fsm:transitionType"/>
    </xsd:sequence>
    <xsd:attribute name="id" type="xsd:token" use="required"/>
    <xsd:attribute name="number" type="xsd:decimal" use="optional"/>
</xsd:complexType>
<xsd:complexType name="transitionType">
    <xsd:sequence>
        <xsd:element maxOccurs="unbounded" minOccurs="0"
name="method" type="fsm:methodType"/>
    </xsd:sequence>
    <xsd:attribute name="id" type="xsd:token" use="required"/>
    <xsd:attribute name="nextState" type="xsd:token" use="optional"/>
```

```
</xsd:complexType>
<xsd:complexType name="nvPairType">
    <xsd:attribute name="name" type="xsd:token"/>
    <xsd:attribute name="value" type="xsd:token"/>
</xsd:complexType>
<xsd:complexType name="methodType">
    <xsd:attribute name="id" type="xsd:token" use="optional"/>
    <xsd:attribute name="name" type="xsd:token" use="required"/>
    <xsd:attribute name="object" type="xsd:token" use="required"/>
</xsd:complexType>
<xsd:complexType name="objectMap">
    <xsd:attribute name="id" type="xsd:token" use="required"/>
    <xsd:attribute name="type" type="fsm:objectType" use="required"/>
    <xsd:attribute name="plugin" type="xsd:token" use="optional"/>
    <xsd:attribute name="instance" type="xsd:token" use="optional"/>
    <xsd:attribute name="properties" type="xsd:token" use="optional"/>
</xsd:complexType>
<xsd:simpleType name="objectType">
    <xsd:restriction base="xsd:token">
        <xsd:enumeration value="managed"/>
        <xsd:enumeration value="unmanaged"/>
        <xsd:enumeration value="runtime"/>
    </xsd:restriction>
</xsd:simpleType>
<xsd:complexType name="loggerType">
    <xsd:attribute name="id" type="xsd:token" use="optional"/>
    <xsd:attribute name="object" type="xsd:token" use="required"/>
    <xsd:attribute default="true" name="enabled" type="xsd:token"
        use="optional"/>
</xsd:complexType>
</xsd:schema>
```

Stanzas in the schema show definitions for fsmType, initialState, finalState, transitionType, methodType and objectMap. Each of these stanzas define the information needed by the flow control engine by means of a proxy to manage the lifecycle of each job.

A valid conforming XML schema instance based on this XML schema illustrated above is illustrated in the XML schema instance that follows.

```
<?xml version="1.0"?>
<fsm xmlns:xsd="http://www.w3.org/2001/XMLSchema-instance"
    xmlns="http://www.ibm.com/distillery/fsm"
    xsd:schemaLocation="http://www.ibm.com/distillery/fsm fsm.xsd"
    id="PE"
    wildcard="ANY"
>
<logger id="fsmlogger" object="fsmlogger" />
<objectmap id="fsmlogger" type="runtime" />
<objectmap id="displogger" type="managed"
plugin="com.ibm.distillery.logger.configurable" instance="dispatcher" />
<objectmap id="fsmimpl" type="runtime" />
<objectmap id="dispatcherStateProcessor" type="runtime" />
<objectmap id="stateCanceling" type="runtime" />
<objectmap id="statePreDispatchCancel" type="runtime" />
<objectmap id="stateDispatching" type="runtime" />
<objectmap id="stateRunning" type="runtime" />
<initial id="start" />
<final id="exit" />
<state id="start" >
    <transition id="enqueue-job" nextState="submitted">
        <method object="fsmimpl" name="fsmEnqueueJob" />
    </transition>
</state>
<state id="submitted" number="1" groupid="predispatch">
    <transition id="parsing" nextState="parsing">
    </transition>
    <transition id="c-hold" nextState="held">
        <method object="fsmimpl" name="fsmEnqueueToHold" />
    </transition>
    <transition id="suspend" nextState="held">
        <method object="fsmimpl" name="fsmEnqueueToHold" />
    </transition>
    <transition id="evict" nextState="held">
        <method object="fsmimpl" name="fsmEnqueueToHold" />
    </transition>
    <transition id="cancel" nextState="cleanup">
        <method object="fsmimpl" name="fsmEnqueueToCancel" />
    </transition>
</state>
<state id="parsing" number="2" groupid="predispatch">
    <transition id="parsed" nextState="resource-match">
        <method object="fsmimpl" name="fsmEnqueueToResourceMatcher" />
    </transition>
    <transition id="c-hold" nextState="held">
        <method object="fsmimpl" name="fsmEnqueueToHold" />
    </transition>
    <transition id="suspend" nextState="held">
        <method object="fsmimpl" name="fsmEnqueueToHold" />
    </transition>
    <transition id="evict" nextState="held">
        <method object="fsmimpl" name="fsmEnqueueToHold" />
    </transition>
    <transition id="cancel" nextState="cleanup">
        <method object="fsmimpl" name="fsmEnqueueToCancel" />
    </transition>
    <transition id="error" nextState="cleanup">
        <method object="fsmimpl" name="fsmEnqueueToCancel" />
    </transition>
</state>
<state id="resource-match" number="3" groupid="predispatch">
    <transition id="resource-match-complete" nextState="template-map">
        <method object="fsmimpl" name="fsmEnqueueDgmMap" />
    </transition>
    <transition id="c-hold" nextState="held">
        <method object="fsmimpl" name="fsmEnqueueToHold" />
    </transition>
    <transition id="suspend" nextState="held">
        <method object="fsmimpl" name="fsmEnqueueToHold" />
    </transition>
    <transition id="evict" nextState="held">
        <method object="fsmimpl" name="fsmEnqueueToHold" />
    </transition>
    <transition id="cancel" nextState="cleanup">
        <method object="fsmimpl" name="fsmEnqueueToCancel" />
    </transition>
    <transition id="error" nextState="cleanup">
        <method object="fsmimpl" name="fsmEnqueueToCancel" />
    <transition>
    <transition id="resource-match-fail" nextState="cleanup">
        <method object="fsmimpl" name="fsmEnqueueToCancel" />
    </transition>
</state>
<state id="template-map" number=4" groupid="predispatch">
    <transition id="template-map-complete" nextState="optimizing">
        <method object="fsmimpl" name="fsmEnqueueToOptimizer" />
    </transition>
    <transition id="c-hold" nextState="held">
        <method object="fsmimpl" name="fsmEnqueueDgmUnmap" />
        <method object="fsmimpl" name="fsmEnqueueToHold" />
    </transition>
    <transition id="suspend" nextState="held">
        <method object="fsmimpl" name="fsmEnqueueDgmUnmap" />
        <method object="fsmimpl" name="fsmEnqueueToHold" />
    </transition>
    <transition id="evict" nextState="held">
        <method object="fsmimpl" name="fsmEnqueueDgmUnmap" />
        <method object="fsmimpl" name="fsmEnqueueToHold" />
    </transition>
    <transition id="cancel" nextState="cleanup">
        <method object="fsmimpl" name="fsmEnqueueDgmUnmap" />
        <method object="fsmimpl" name="fsmEnqueueToCancel" />
    </transition>
    <transition id="error" nextState="cleanup">
        <method object="fsmimpl" name="fsmEnqueueDgmUnmap" />
        <method object="fsmimpl" name="fsmEnqueueToCancel" />
    </transition>
    <transition id="template-map-fail" nextState="cleanup">
        <method object="fsmimpl" name="fsmEnqueueToCancel" />
    </transition>
</state>
<state id="optimizing" number="5" groupid="predispatch">
```

-continued

```
<transition id="optimized" nextState="dgm_instantiate">
    <method object="fsmimpl" name="fsmEnqueueDgmInstantiate" />
</transition>
<transition id="c-hold" nextState="held">
    <method object="fsmimpl" name="notifyGmJobWithdrawn" />
    <method object="fsmimpl" name="fsmEnqueueToHold" />
</transition>
<transition id="suspend" nextState="held">
    <method object="fsmimpl" name="notifyGmJobWithdrawn" />
    <method object="fsmimpl" name="fsmEnqueueToHold" />
</transition>
<transition id="evict" nextState="held">
    <method object="fsmimpl" name="notifyGmJobWithdrawn" />
    <method object="fsmimpl" name="fsmEnqueueToHold" />
</transition>
<transition id="cancel" nextState="cleanup">
    <method object="fsmimpl" name="notifyGmJobWithdrawn" />
    <method object="fsmimpl" name="fsmEnqueueToCancel" />
</transition>
<transition id="error" nextState="cleanup">
    <method object="fsmimpl" name="notifyGmJobWithdrawn" />
    <method object="fsmimpl" name="fsmEnqueueToCancel" />
</transition>
</state>
<state id="dgm_instantiate" number="5.5" groupid="predispatch">
    <transition id="job-instantiated" nextState="dispatching">
        <method object="dispatcherStateProcessor" name="doDispatching" />
    </transition>
    <transition id="c-hold" nextState="held">
        <method object="fsmimpl" name="notifyGmJobWithdrawn" />
        <method object="fsmimpl" name="fsmEnqueueToHold" />
    </transition>
    <transition id="suspend" nextState="held">
        <method object="fsmimpl" name="notifyGmJobWithdrawn" />
        <method object="fsmimpl" name="fsmEnqueueToHold" />
    </transition>
    <transition id="evict" nextState="held">
        <method object="fsmimpl" name="notifyGmJobWithdrawn" />
        >method object="fsmimpl" name="fsmEnqueueToHold" />
    </transition>
    <transition id="cancel" nextState="cleanup">
        <method object="fsmimpl" name="notifyGmJobWithdrawn" />
        <method object="fsmimpl" name="fsmEnqueueToCancel" />
    </transition>
    <transition id="dgm-instantiate-fail" nextState="cleanup">
        <method object="fsmimpl" name="notifyGmJobWithdrawn" />
        <method object="fsmimpl" name="fsmEnqueueToCancel" />
    </transition>
    <transition id="error" nextState="cleanup">
        <method object="fsmimpl" name="notifyGmJobWithdrawn" />
        <method object="fsmimpl" name="fsmEnqueueToCancel" />
    </transition>
</state>
<state id="held" number="6" groupid="inactive">
    <transition id="resume" nextState="submitted">
        <method object="fsmimpl" name="fsmEnqueueJob" />
    </transition>
    <transition id="m-released" nextState="submitted">
        <method object="fsmimpl" name="fsmEnqueueJob" />
    </transition>
    <transition id="n-restarted" nextState="submitted">
        <method object="fsmimpl" name="fsmEnqueueJob" />
    </transition>
    <transition id="cancel" nextState="cleanup">
        <method object="fsmimpl" name="fsmEnqueueToCancel" />
    </transition>
</state>

<!--
    There's no code associated with the "dispatching" state
    transitions. Events simply change the state but allow the
    current action to continue. The next event that occurs
    will then dictate a different action as decided by what-
    ever state we happen to be in at the time.
    For example, if a "suspend" comes in while dispatching,
    we must complete the dispatch before actually suspend-
    ing. We therefore simple move to state "predispatch-
    suspend" so when the "o-dispatched" event comes in the
    "predispatch-suspend" state can then, and only then,
    start suspending the job.
-->

<!-- 7. Dispatching -->
<state id="dispatching" number="7" groupid="active">
    <transition id="suspend" nextState="predispatch-suspend">
        <method object="dispatcherStateProcessor" name="doPredispatchSuspend" />
    </transition>
    <transition id="optimized" nextState="dispatching">
        <method object="dispatcherStateProcessor" name="doDispatchingRevisions" />
    </transition>
    <transition id="dispatched" nextState="running">
        <method object="dispatcherStateProcessor" name="doRunning" />
    </transition>
    <transition id="timedRetry" nextState="dispatching">
        <method object="dispatcherStateProcessor" name="doDispatchingRetry" />
    </transition>
    <transition id="cancel" nextState="predispatch-cancel">
        <method object="dispatcherStateProcessor" name="doPredispatchCancel" />
    </transition>
    <transition id="evict" nextState="13-predispatch-evict">
        <method object="dispatcherStateProcessor" name="doPredispatchEvict" />
    </transition>
    <transition id="asynchronousStatusUpdate" nextState="dispatching">
        <method object="stateDispatching" name="doPeStatusRecordAndAnalyze" />
    </transition>
    <transition id="jobStateAnalysis" nextState="dispatching">
        <method object="stateDispatching" name="doJobStateAnalysis" />
    </transition>
    <transition id="ANY">
        <method object="dispatcherStateProcessor" name="doTransitionFault" />
    </transition>
</state>
<!-- 8. Running -->
<state id="running" number="8" groupid="active">
    <transition id="optimized" nextState="running">
```

-continued

```
      <method object="dispatcherStateProcessor" name="doRunningRevisions" />
    </transition>
    <transition id="retry" nextState="dispatching">
      <method object="dispatcherStateProcessor" name="doRunningRetry" />
    </transition>
    <transition id="dispatched" nextState="running">
    </transition>
    <transition id="suspend" nextState="suspending">
      <method object="dispatcherStateProcessor" name="doSuspending" />
    </transition>
    <transition id="cancel" nextState="canceling">
      <method object="dispatcherStateProcessor" name="doCanceling" />
    </transition>
    <transition id="exit" nextState="exiting">
      <method object="dispatcherStateProcessor" name="doExiting" />
    </transition>
    <transition id="evict" nextState="evicting">
      <method object="dispatcherStateProcessor" name="doEvicting" />
    </transition>
    <transition id="asynchronousStatusUpdate" nextState="running">
      <method object="stateRunning" name="doPeStatusRecordAndAnalyze" />
    </transition>
    <transition id="jobStateAnalysis" nextState="running">
      <method object="stateRunning" name="doJobStateAnalysis" />
    </transition>
    <transition id="ANY">
      <method object="dispatcherStateProcessor" name="doTransitionFault" />
    </transition>
  </state>
  <!-- 9. Exiting -->
  <state id="exiting" number="9" groupid="terminating">
    <transition id="exitComplete" nextState="complete">
      <method object="dispatcherStateProcessor" name="doComplete" />
        <method object="fsmimpl" name="removeJob" />
    </transition>
    <transition id="ANY">
      <method object="dispatcherStateProcessor" name="doTransitionFault" />
    </transition>
  </state>
  <!-- 10. Suspended -->
  <state id="suspended" number="10" groupid="inactive">
    <transition id="resume" nextState="resuming">
    <method object="dispatcherStateProcessor" name="doResuming" />
    </transition>
    <transition id="cancel" nextState="resume-for-cancel">
    <method object="dispatcherStateProcessor" name="doResumeForCancel" />
    </transition>
    <transition id="evict" nextState="resume-for-eviction">
    <method object="dispatcherStateProcessor" name="doResumeForEviction" />
    </transition>
    <transition id="ANY">
    <method object="dispatcherStateProcessor" name="doTransitionFault" />
    </transition>
  </state>
  <!-- 11. Predispatch Suspend -->
  <state id="predispatch-suspend" number="11" groupid="predispatch">
    <transition id="error" nextState="predispatch-cancel">
    <method object="dispatcheStateProcessor" name="doPredispatchCancel" />
    </transition>
    <transition id="cancel" nextState="predispatch-cancel">
    <method object="dispatcherStateProcessor" name="doPredispatchCancel" />
    </transition>
    <transition id="evict" nextState="13-predispatch-evict">
    <method object="dispatcherStateProcessor" name="doPredispatchEvict" />
    </transition>
    <transition id="dispatched" nextState="suspending">
    <method object="dispatcherStateProcessor" name="doSuspending" />
    </transition>
    <transition id="resume" nextState="dispatching">
    <method object="dispatcherStateProcessor" name="doDispatching" />
    </transition>
    <transition id="ANY">
    <method object="dispatcherStateProcessor" name="doTransitionFault" />
    </transition>
  </state>
  <!-- 12. Evicting -->
  <state id="evicting" number="12" groupid="terminating">
    <transition id="cancel" nextState="canceling">
    <method object="dispatcherStateProcessor" name="doCanceling" />
    </transition>
```

```
    <transition id="error" nextState="canceling">
    <method object="dispatcherStateProcessor" name="doCanceling" />
    </transition>
    <transition id="evictionComplete" nextState="state: Held">
    <method object="dispatcherStateProcessor" name="doHeld" />
    </transition>
    <transition id="ANY">
    <method object="dispatcherStateProcessor" name="doTransitionFault" />
    </transition>
</state>
<!-- 13. Predispatch Evict -->
<state id="13-predispatch-evict" number="13" groupid="predispatch">
    <transition id="cancel" nextState="predispatch-cancel">
    <method object="dispatcherStateProcessor" name="doPredispatchCancel" />
    </transition>
    <transition id="error" nextState="canceling">
    <method object="dispatcherStateProcessor" name="doCanceling" />
    </transition>
    <transition id="dispatched" nextState="evicting">
    <method object="dispatcherStateProcessor" name="doEvicting" />
    </transition>
    <transition id="ANY">
    <method object="dispatcherStateProcessor" name="doTransitionFault" />
    </transition>
</state>
<!-- 14. Predispatch Cancel -->
<state id="predispatch-cancel" number="14" groupid="predispatch">
    <transition id="dispatched" nextState="canceling">
    <method object="dispatcherStateProcessor" name="doCanceling" />
    </transition>
    <transition id="error" nextState="canceling">
    <method object="dispatcherStateProcessor" name="doCanceling" />
    </transition>
    <transition id="cancelComplete" nextState="complete">
    <method object="dispatcherStateProcessor" name="doComplete" />
    <method object="fsmimpl" name="removeJob" />
    </transition>
    <transition id="asynchronousStatusUpdate" nextState="predispatch-cancel">
    <method object="statePreDispatchCancel" name="doPeStatusRecordAndAnalyze" />
    </transition>
    <transition id="jobStateAnalysis" nextState="predispatch-cancel">
    <method object="statePreDispatchCancel" name="doJobStateAnalysis" />
    </transition>
    <transition id="ANY">
    <method object="dispatcherStateProcessor" name="doTransitionFault" />
    </transition>
</state>
<!-- 15. Resume for Cancel -->
<state id="resume-for-cancel" number="15" groupid="terminating">
    <transition id="resumeComplete" nextState="canceling">
    <method object="dispatcherStateProcessor" name="doCanceling" />
    </transition>
    <transition id="error" nextState="canceling">
    <method object="dispatcherStateProcessor" name="doCanceling" />
    </transition>
    <transition id="ANY">
    <method object="dispatcherStateProcessor" name="doTransitionFault" />
    </transition>
</state>
<!-- 16. Resume for Eviction -->
<state id="resume-for-eviction" number="16" groupid="terminating">
    <transition id="cancel" nextState="resume-for-cancel">
    <method object="dispatcherStateProcessor" name="doResumeForCancel" />
    </transition>
    <transition id="error" nextState="state: Cancel">
    <method object="dispatcherStateProcessor" name="doResumeForCancel" />
    </transition>
    <transition id="resumeComplete" nextState="evicting">
    <method object="dispatcherStateProcessor" name="doEvicting" />
    </transition>
    <transition id="error" nextState="evicting">
    <method object="dispatcherStateProcessor" name="doEvicting" />
    </transition>
    <transition id="ANY">
    <method object="dispatcherStateProcessor" name="doTransitionFault" />
    </transition>
</state>
<!-- 17. Cancelling -->
<state id="canceling" number="17" groupid="terminating">
    <transition id="cancelComplete" nextState="complete">
```

```xml
        <method object="dispatcherStateProcessor" name="doComplete" />
        <method object="fsmimpl" name="removeJob" />
      </transition>
      <transition id="timedRetry" nextState="canceling">
        <method object="dispatcherStateProcessor" name="doCancelingRetry" />
      </transition>
      <transition id="asynchronousStatusUpdate" nextState="canceling">
        <method object="stateCanceling" name="doPeStatusRecordAndAnalyze" />
      </transition>
         <transition id="jobStateAnalysis" nextState="canceling">
        <method object="stateCanceling" name="doJobStateAnalysis" />
      </transition>
      <transition id="ANY">
        <method object="dispatcherStateProcessor" name="doTransitionFault" />
      </transition>
</state>
<!-- 18. Suspending -->
<state id="suspending" number="18" groupid="active">
   <transition id="resume" nextState="resuming">
      <method object="dispatcherStateProcessor" name="doResuming" />
   </transition>
   <transition id="cancel" nextState="resume-for-cancel">
      <method object="dispatcherStateProcessor" name="doResumeForCancel" />
   </transition>
   <transition id="evict" nextState="resume-for-eviction">
      <method object="dispatcherStateProcessor" name="doResumeForEviction" />
   </transition>
   <transition id="suspendComplete" nextState="suspended">
      <method object="dispatcherStateProcessor" name="doSuspended" />
   </transition>
   <transition id="ANY">
      <method object="dispatcherStateProcessor" name="doTransitionFault" />
   </transition>
</state>
<!-- 19. Resuming -->
<state id="resuming" number="19" groupid="active">
   <transition id="cancel" nextState="resume-for-cancel">
      <method object="dispatcherStateProcessor" name="doResumeForCancel" />
   </transition>
   <transition id="evict" nextState="resume-for-eviction">
      <method object="dispatcherStateProcessor" name="doResumeForEviction" />
   </transition>
   <transition id="resumeComplete" nextState="running">
      <method object="dispatcherStateProcessor" name="doRunning" />
   </transition>
   <transition id="ANY">
      <method object="dispatcherStateProcessor" name="doTransitionFault" />
   </transition>
</state>
<!-- 20. Complete -->
<state id="complete" number="20" groupid="complete">
</state>
<!-- 21. Transition Fault -->
<state id="transition-fault" number="21" groupid="error">
</state>
<state id="cleanup" number="22">
   <transition id="exit" nextState="exit">
      <method object="fsmimpl" name="removeJob" />
   </transition>
</state>
<state id="exit">
</state>
</fsm>
```

The XML schema instance is for jobs of type PE, as indicated by the statement "id=PE". Logging of FSM control flows is enabled through employment of a runtime instantiation of a class symbolically known as fsmlogger. A job manager, through its configuration, instantiates a logging class at runtime and associates it with the symbol fsmlogger, which may then be employed by reference to perform logging activities. Other FSM control transitions, for example tracing, recording, and notification, are similarly handled.

Exemplary systems and methods in accordance with the present invention utilize a job manager that is capable of simultaneously managing different types of job control flows corresponding to different jobs types. In one embodiment, the job control flows are externally specified using XML documents conforming to an XML schema. An example of an XML schema conforming XML document is illustrated above. An example XML instance corresponding to the FSM depicted, for example, in FIGS. 4A-B for a PE job type is illustrated above in the XML schema instance.

At boot time, and subsequently upon request, the system job manager runtime locates XML flow control instance definitions, e.g. in the XML schema instance listed above, describing valid job control flows for different job types. Each XML flow control instance is validated against a schema, e.g.

as listed above, and upon successful verification is incorporated as a supported job type. Jobs that are submitted and accepted are classified by job type and are controlled by the system job manager according to the XML flow control instance corresponding to the associated job type. Control is facilitated through the use of a proxy.

A proxy instance, corresponding to a valid job type flow control instance, is created for each submitted job by the job manager. The job manager uses this proxy to move the associated job from state to state via transitions as specified in the corresponding FSM flow control instance.

For example, a job of job type PE may be submitted to the job manager runtime, which is responsible for controlling submitted jobs from start to finish according to its job type in correspondence with an XML flow control. As used herein, "job manager", "job runtime manager", "system job manager", "flow control engine" and "runtime engine" refer to similar or synonymous aspects of the present invention. The job manager first determines which (if any) known job type corresponds to the submitted job. Submitted jobs of unknown job type may be rejected. For accepted submitted jobs, a proxy instance is created, and the corresponding job control flow is followed. For job type PE, the start state 410 is followed by transition to the Submitted state 445 by way of transition enqueue-job 446 (FIG. 4A). Similarly, when a job of job type system is submitted to the system job manager runtime, the corresponding control flow (FIGS. 5A-B) is located and followed. As shown in FIGS. 4A-B and 5A-B, the job control flows for type PE and type-system jobs are different; however, the system job manager can orchestrate both simultaneously.

Figure 6:
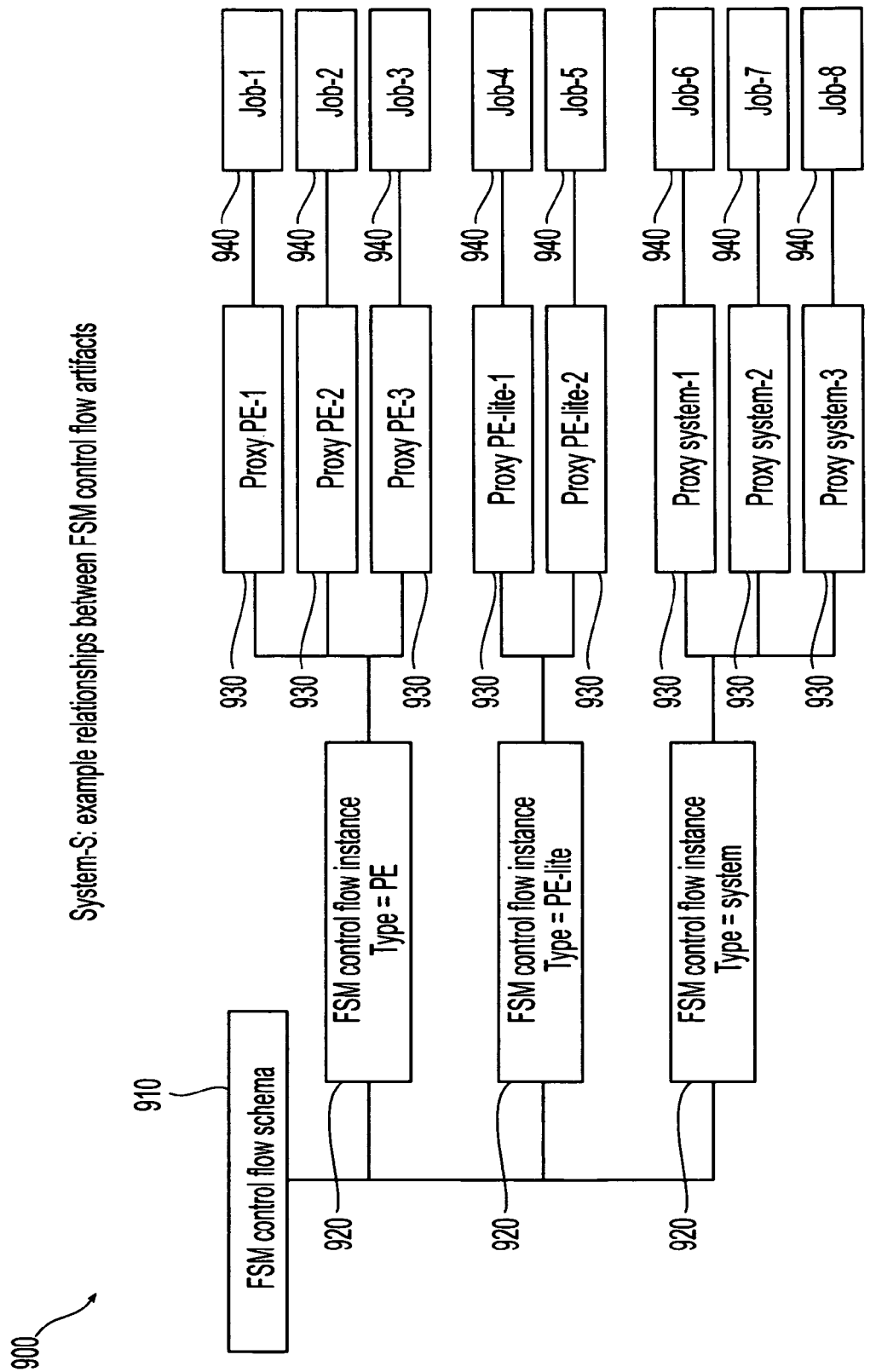
FIG. 6 is a schematic of an embodiment of the relationships among finite state machine flow control artifacts.

Referring to FIG. 6, a diagram 900 illustrating example relationships between FSM flow control artifacts within a domain is shown. An FSM flow control schema 910 is used by a job manager to validate FSM flow control instances 920. When a job 940 arrives for processing, the job manager creates a proxy 930 corresponding to that job's type. This proxy is used to move the job from state to state via transitions according to the associated FSM instance flow control definition. Events occurring relative to a job trigger corresponding transitions applied to the job's related proxy, which in turn causes the state changes according to the proxy's associated FSM flow control instance. Since each job has an associated proxy, and since the proxy may be associated with different FSM flow controls, the job manager is able to carry out different job control flows based upon job type.

Figure 7:
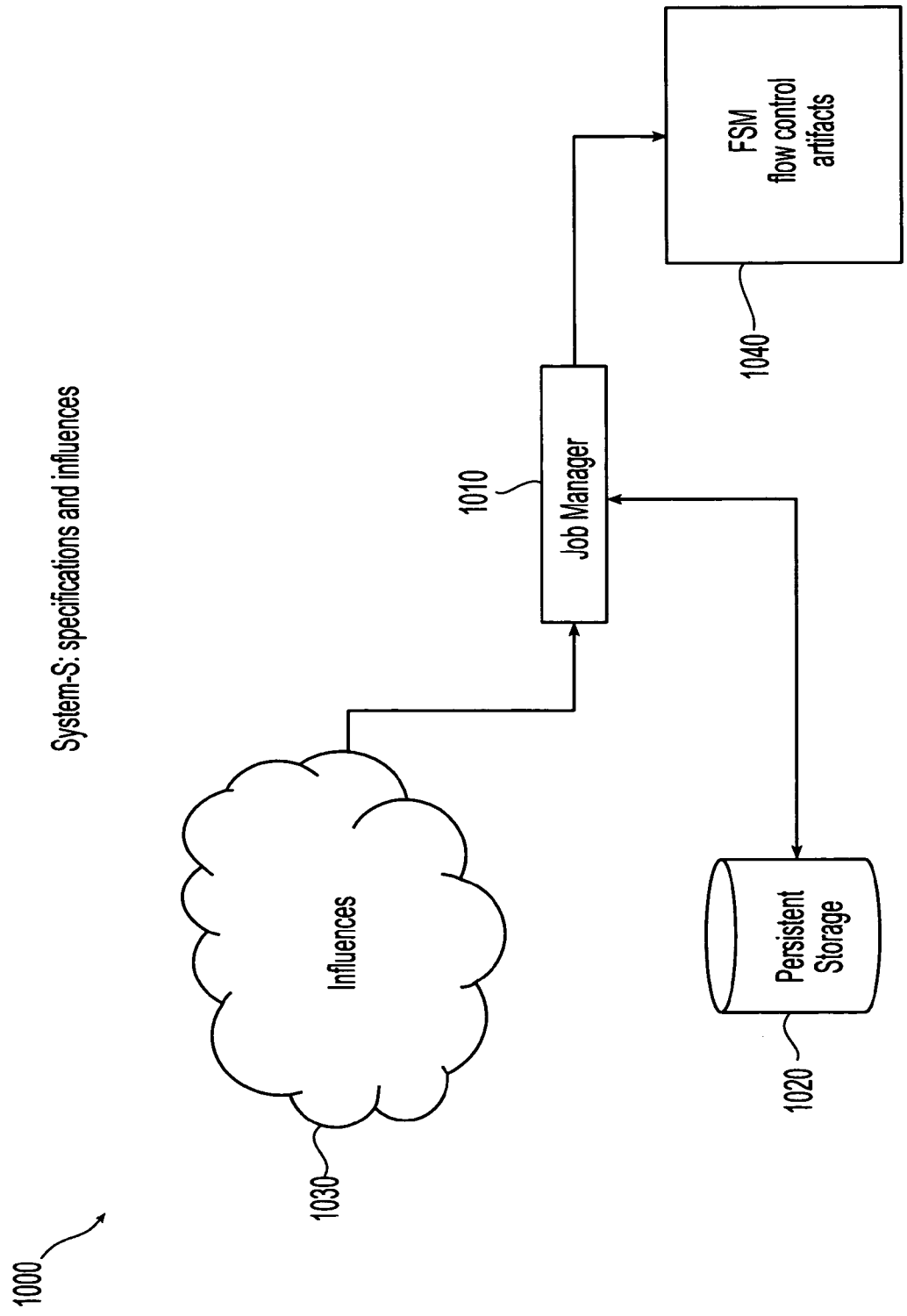
FIG. 7 is a schematic illustrating an embodiment of job management specification and influences.

Referring to FIG. 7, a diagram 1000 illustrating job management specifications and influences is shown. A system job manager 1010 within a domain obtains its configuration information relative to job management flow control from a variety of sources at a variety of times. The job manager obtains FSM flow control schema and instance definitions at boot time from persistent storage 1020. In addition, the job manager obtains new job type flow control from influencers 1030 both outside and within its system domain. Suitable influencers include expert systems and humans, among others. Other externalized sources of specifications and influences can also be utilized. Using these different sources, the job manager accepts and orchestrates jobs following different flow controls utilizing FSM flow control artifacts 1040 as described above. The job manager interrogates persistent storage periodically or upon command to find new, delete old, and update existing FSM flow controls. In addition, influencers send such FSM control flow lifecycle changes. In general, the job manager does not require modification or restarting to put such changes into effect. Thus, externalized dynamic flow control additions, deletions and modifications are supported.

Similarly, the job manager 1010 decides which FSM transitions to make during runtime based upon input from configuration data 1020, job specifications 120 (of FIG. 1) and influencers 1030. For example, when job fault or error conditions occur, such as PE failure or node failure where a PE is executing, the job or system configuration can stipulate a policy of terminating the job or a policy of continuing the job, as the PE may not be essential.

In accordance with one exemplary embodiment of a method for unified job processing of interdependent heterogeneous tasks, at least one and potentially a plurality of jobs are submitted to the job manager. These jobs are submitted for execution on one or more of a plurality of nodes disposed within a given domain. These jobs are received and processed by a job manager disposed within the domain. In one embodiment, each submitted job is saved to a persistent storage location, which can be disposed either within the domain or external to the domain.

The submitted jobs are analyzed, and a job type associated with each submitted job is identified. Suitable job types include a program element job type or a system job type. A determination is also made about whether or not the identified job type is associated with a job control flow that is supported by the system in which the job is to be processed. If the job control flow associated with the job type is not supported by the system, then the submitted job is rejected. Prior to rejection, the job manager can appeal to authorities, e.g. persistent storage and expert systems among others, to search for a corresponding job type control flow. If the identified job type is supported, then the job is processed accordingly. In one embodiment, for example, identification of the job control flow includes identifying a job control flow associated with a job type, and acceptance of the submitted job includes accepting i submitted job of the job type associated with the job control flow. In one embodiment, the job control flow is interpreted using a runtime engine. The runtime engine also facilitates the use of at least two different job control flows in parallel. In addition, a proxy employed by the runtime engine can be used to represent the current state of the accepted job within the job control flow. In one embodiment, identification of the job control flow includes obtaining the job control flow from an external source such as an extensible mark-up language definition, a database, an expert system and combinations thereof. Identification of a job control flow can take place at various times. For example, the job control flow can be identified at runtime initialization, at a timed interval, in response to a message, in response to a job submission and combinations thereof. In addition, the identified job control flow can be revised subsequent to runtime initialization.

In order to process the submitted job in the system, a job control flow to be used to process the submitted job in the given domain is identified. In one embodiment, the job control flow is selected based on the identified job type. Identification and selection of the job type can be accomplished by identifying a job control flow from a plurality of pre-determined job control flows. This plurality of pre-determined job control flows can be maintained as a set or a list, where a set is an example of an un-ordered collection and a list is an example of an ordered collection. The set or list is maintained by adding job control flows to the set or list, removing job control flows from the set or list and modifying existing job control flows in the set or list. Maintenance of the set or list can be accomplished by sources either internal to or external to the system. In one embodiment, selection of the job control flow includes identifying a FSM flow control instance associated with the identified job type. This identified FSM flow control instance can be selected from a plurality of pre-determined FSM flow control instances wherein each FSM flow control instance corresponds to a distinct FSM flow control definition. In one embodiment, each FSM flow control definition is expressed using extensible mark-up language. In one embodiment, the identified job control flow conforms to a schema defining a FSM. The FSM includes at least one start state for job submission, at least one final state for job completion and one or more intermediate states disposed between the start state and the final state. Disposed between each state are one or more transitions that provide the framework for advancing between states. The FSM can include any desired combination of these elements to provide suitable job control flow for the submitted job types.

Having received the submitted job, determined the job type and identified an associated job control flow, each submitted job is processed in accordance with the selected job control flow using one or more of the plurality of nodes contained within the domain. In one embodiment, each job component, e.g. PE, is exclusively associated with a given job. Alternatively, job components, for example PEs, are shared by two or more jobs, and processing the accepted job includes managing at least one shared job component. Since each job contains a plurality of components or sub-tasks, processing each submitted job in accordance with the job control flow involves identifying the components that constitute each submitted job. A determination is then made as to which nodes or resources within the domain are available and capable of processing each component. These resources are matched to the identified components, for example by identifying eligible nodes within the domain for executing each one of the identified components. Therefore, each component can be matched to a plurality of nodes or resources within the domain. The dispatch of each component is scheduled among the various nodes, and this schedule is delivered to a dispatch controller. The controller arranges execution of all of the components among the various domain resources in accordance with the dispatch schedule provided. The various components are then dispatched to nodes for execution in accordance with the arranged execution.

In addition, processing the accepted job in the domain can also include changing the current state of the accepted job as represented by a proxy employed by the runtime engine. Changes in the current state are accomplished using transitions. Suitable transitions include, but are not limited to notification of the completion of a subtask, notification of a subtask error, notification of subtask migration, notification of a node failure, notification of job submission, notification of job validation, notification of job resource matching, notification of job optimization, notification of job dispatching, notification of job holding, notification of job running, notification of a job cancellation, notification of job suspension, notification of job resumption, notification of job eviction, notification of job checkpoint, notification of job completion, notification of a timer expiration and combinations thereof.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for unified job processing of interdependent heterogeneous tasks in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for unified job processing of interdependent heterogeneous tasks, the method comprising:
    submitting a job to be executed within a given domain on a plurality of nodes disposed within the given domain, the submitted job comprising a plurality of components;
    identifying a job type associated with the submitted job based on the plurality of components;
    selecting a job control flow to be used to process the submitted job in the given domain based on the identified job type;
    specifying the job control flow as a finite state machine job control flow using an extensible mark-up language document;
    using an extensible mark-up language schema comprising a description of valid finite state machine control flow instances to parse and to validate the finite state machine job control flow associated with the identified job type; and
    processing the submitted job in accordance with the validated finite state machine job control flow associated with the identified job type using one or more of the plurality of nodes.

2. The method of claim 1, further comprising saving the submitted job to a persistent storage location.

3. The method of claim 1, wherein the identifying the job type comprises identifying the job type as a program element job type, a system-administration job type, a system-maintenance job type, a network-manager job type, a security-manager job type, a storage-manager job type or combinations thereof.

4. The method of claim 1, wherein the selecting the job control flow comprises identifying a job control flow from a plurality of pre-determined job control flows.

5. The method of claim 4, further comprising maintaining at least one of a set and a list comprising the plurality of pre-determined job control flows.

6. The method of claim 1, wherein the specifying the job control flow as the finite state machine job control flow comprises selecting a finite state machine job control flow from a plurality of pre-determined finite state machine job control flows, each finite state machine job control flow corresponding to a distinct finite state machine flow control definition.

7. The method of claim 6, further comprising expressing each finite state machine flow control definition using extensible mark-up language.

8. The method of claim 1, wherein processing the submitted job in accordance with the finite state machine job control flow comprises:
    identifying the plurality of components of the submitted job;
    matching resources to the identified components by identifying eligible nodes within the domain for executing each one of the identified components;
    scheduling a dispatch of each identified component among the identified eligible nodes;
    delivering the dispatch schedule to a dispatch controller;
    arranging execution of the identified plurality of components in accordance with the dispatch schedule; and
    dispatching the identified plurality of components to the identified eligible nodes in accordance with the arranged execution.

9. A method for unified job processing of interdependent heterogeneous tasks, the method comprising:
    identifying a job control flow used to process submitted jobs within a given domain based on an identified job type associated with the submitted jobs;
    interpreting the job control flow using a runtime engine;
    specifying the job control flow as a finite state machine job control flow using an extensible mark-up language document;
    using an extensible mark-up language schema comprising a description of valid finite state machine control flow instances to parse and to validate the finite state machine job control flow associated with the identified job type;
    accepting a submitted job of the identified job type and associated with the identified job control flow; and
    processing the accepted job in accordance with the validated finite state machine job control flow associated with the identified job type.

10. The method of claim 9, wherein the finite state machine job control flow comprises one start state comprising job submission, a final state comprising job completion, one or more intermediate states, one or more transitions to advance between states or combinations thereof.

11. The method of claim 9, further comprising using a proxy employed by the runtime engine to represent a current state of the accepted job.

12. The method of claim 11, wherein the processing the accepted job further comprises changing the current state of the accepted job as represented by the proxy using transitions, the transitions comprising notification of completion of a subtask, notification of a subtask error, notification of subtask migration, notification of a node failure, notification of job submission, notification of job validation, notification of job resource matching, notification of job optimization, notification of job dispatching, notification of job holding, notification of job running, notification of a job cancellation, notification of job suspension, notification of job resumption, notification of job eviction, notification of job checkpoint, notification of job completion, notification of a timer expiration, or combinations thereof.

13. The method of claim 9, further comprising employing at least two different job control flows in parallel using the runtime engine.

14. The method of claim 9, wherein the processing the accepted job further comprises managing at least one shared program element.

15. The method of claim 9, wherein the identifying the job control flow further comprises obtaining the job control flow from an external source comprising an extensible mark-up language definition, a database, an expert system or combinations thereof.

16. The method of claim 9, wherein the identifying the job control flow further comprises identifying the job control flow at runtime initialization, identifying the job control flow at a timed interval, identifying the job control flow in response to a message or combinations thereof.

17. The method of claim 9, further comprising revising the identified job control flow subsequent to runtime initialization.

18. A non-transitory computer-readable storage medium containing a computer-readable code that when read by a computer causes the computer to perform a method for unified job processing of interdependent heterogeneous tasks, the method comprising:
    submitting a job to be executed within a given domain on a plurality of nodes disposed within the given domain, the submitted job comprising a plurality of components;
    identifying a job type associated with the submitted job based on the plurality of components;
    selecting a job control flow to be used to process the submitted job in the given domain based on the identified job type;

specifying the job control flow as a finite state machine job control flow using an extensible mark-up language document;

using an extensible mark-up language schema comprising a description of valid finite state machine control flow instances to parse and to validate the finite state machine job control flow associated with the identified job type; and processing the submitted job in accordance with the validated finite state machine job control flow associated with the identified job type using one or more of the plurality of nodes.

\* \* \* \* \*